(12) United States Patent
Gunsberg et al.

(10) Patent No.: US 11,410,260 B2
(45) Date of Patent: Aug. 9, 2022

(54) ONLINE TRANSACTION PLATFORM SYSTEM AND METHOD

(71) Applicants: Daniel S. Gunsberg, Highland Park, IL (US); Robert F. Levy, Highland Park, IL (US)

(72) Inventors: Daniel S. Gunsberg, Highland Park, IL (US); Robert F. Levy, Highland Park, IL (US)

(*) Notice: Subject to any disclaimer, the term of this patent is extended or adjusted under 35 U.S.C. 154(b) by 71 days.

(21) Appl. No.: 16/787,991

(22) Filed: Feb. 11, 2020

(65) Prior Publication Data

US 2020/0258185 A1    Aug. 13, 2020

Related U.S. Application Data

(60) Provisional application No. 62/803,984, filed on Feb. 11, 2019.

(51) Int. Cl.
| | |
|---|---|
| A63F 9/24 | (2006.01) |
| G06Q 50/34 | (2012.01) |
| G06Q 40/06 | (2012.01) |
| G06Q 20/08 | (2012.01) |
| G07F 17/32 | (2006.01) |
| G06Q 30/02 | (2012.01) |

(52) U.S. Cl.
CPC .......... *G06Q 50/34* (2013.01); *G06Q 20/085* (2013.01); *G06Q 30/0236* (2013.01); *G06Q 40/06* (2013.01); *G07F 17/3244* (2013.01); *G07F 17/3288* (2013.01); *G07F 17/3237* (2013.01)

(58) Field of Classification Search
CPC ............... G06Q 40/04; G06Q 30/0206; G06Q 30/0202; G06Q 30/02; G06Q 30/0204
See application file for complete search history.

(56) References Cited

U.S. PATENT DOCUMENTS

| | | | |
|---|---|---|---|
| 7,519,554 B2 | 4/2009 | Gogol et al. | |
| 8,529,337 B2 | 9/2013 | Schehctman | |
| 8,738,499 B2 | 5/2014 | Montanaro et al. | |
| 9,697,698 B2 | 7/2017 | Schechtman | |
| 2017/0085545 A1* | 3/2017 | Lohe | G06Q 20/065 |
| 2019/0236627 A1* | 8/2019 | Christensen | G06Q 10/067 |
| 2019/0361917 A1* | 11/2019 | Tran | G06F 16/28 |

* cited by examiner

*Primary Examiner* — Omkar A Deodhar
*Assistant Examiner* — Eric M Thomas
(74) *Attorney, Agent, or Firm* — Burgett IP LLC

(57) ABSTRACT

An apparatus and method and computer readable storage to conduct transactions that allow users to establish positions on underlying events. The method disclosed herein can allow user to establish positions using money, credits or points, and if the position is successfully, the user can receive a payout on the position, which may include, money credits, points, or prizes. The transactions can relate to financial instruments and financial transaction and can also be used for games and gaming.

20 Claims, 10 Drawing Sheets

Figure 5A
Figure 5B
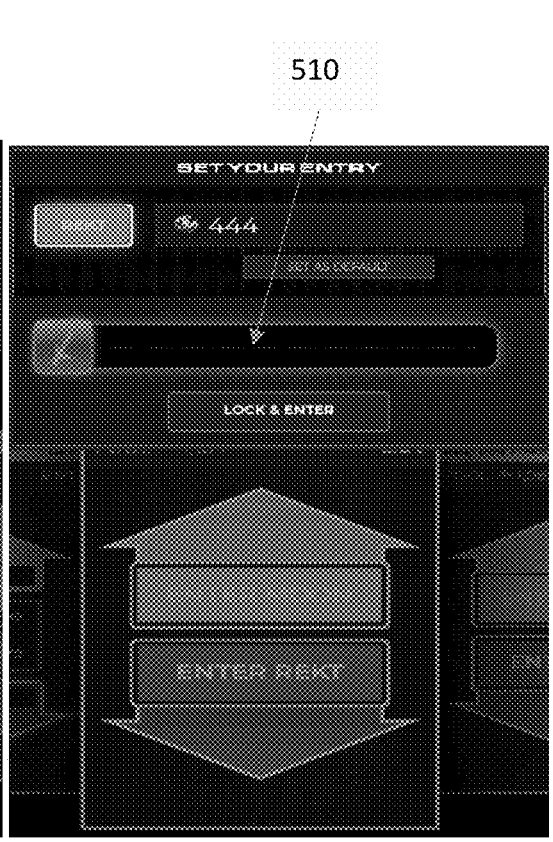

US 11,410,260 B2

ONLINE TRANSACTION PLATFORM SYSTEM AND METHOD

RELATED APPLICATION

This application claims the benefit, under 35 U.S.C. § 119(e), of U.S. Provisional Patent Application No. 62/803,984, filed on Feb. 11, 2019 entitled "Online Gaming Platform System and Application" which is herein incorporated by reference.

FIELD OF INVENTION

The present disclosure pertains generally to online transaction systems and methods, and more specifically, to facilitating exchanges between users and managing users accounts for transactions that allows users to acquire a position on the outcome of an event with two discrete, possible outcomes using a floating strike point option with a pool-based pari-mutuel payoff. These online transaction systems and methods can be used for financial transactions, games and gaming among other things.

BACKGROUND

Digital options are financial exotic options in which the payoff is either a fixed monetary amount or nothing at all. The two main types of digital options are "cash-or nothing" and "asset-or-nothing" digital options. The "cash-or-nothing" digital option pays out some fixed amount of cash if the option expires up in-the-money while the "asset-or-nothing" pays out the value of the asset. The payout generally does not depend on the amount by which the option ends up in-the-money. The option pays out nothing if the option is not in the money.

Digital options are based on a simple yes or no proposition. In other words, will the value of an underlying asset be above a certain price at a certain time. The certain price is commonly referred to as the "strike price." For a digital "call," or "yes," the option pays if the final value is greater than or equal to a strike price for the option. For a digital "put," or "no," the option pays if the final value is less than the strike price for the option.

In traditional "cash-or-nothing" options the accepted formula for the strike price is $$C = e^{-r(T-t)} \Phi(d_2)$$

where r is the risk free rate at which the currency used to buy the option may be invested without the risk of bankruptcy, T is the maturity time of the call, t is the current time, e is the exponential function, and $\Phi$ is the standard normal cumulative distribution function, which is defined as $$\Phi(x) = \frac{1}{\sqrt{2x}} \int_{-\infty}^{x} e^{-x^2/2} dx$$

and $d_2$ is defined in terms of $d_1$ as $$d_1 = \frac{\ln\frac{s}{k} + (r - \sigma^2/2)(T-t)}{\sigma\sqrt{T-t}}, \quad d_2 = d_1 - \sigma\sqrt{T-t}$$

where K is the agreed-upon strike price for the option, $\sigma$ is the volatility (or standard deviation) of the underlying asset, S is the spot price of the underlying asset and t, T, and r are as above.

These options generally require a counterparty to the transactions. For options, the counter-party is generally the option writer. With over-the-counter options, the option writer is a source of risk commonly known as counterparty risk. The option writer could fail to perform, refuse to perform, or be unable to perform, and the option holder would be left with no recourse.

In addition, problems can arise when a disproportionate amount of parties desire to take one side of an option. In traditional situations, parties may be influenced by knowledge of the parties and positions on either side of an option, and the natural market sentiment is not reflected. Thus, a need exists to reduce this risk and influence from an options aspect of the transactions.

SUMMARY

This summary is provided to introduce a selection of concepts that are further described herein below in the detailed description. This summary is not intended to identify key or essential features of the claimed subject matter, nor is it intended to be used as an aid in limiting the scope of the claimed subject matter.

In some examples, a device is disclosed. The device comprises a memory that stores instructions and a processor coupled to the memory and in communication with a plurality of remote computing devices, each with a user. The processor, responsive to executing the instructions, receives consistent updates regarding a price of an asset and communicating the price to the plurality of remote computing devices. The processor then begins the position acquisition period. During the position acquisition period, the processor receives from the at least one user a position that the price of the asset at the end of event period will be greater than the price of the assert at the beginning of the event period or a position that the price of the asset at the end of the event period will be less than the price of the asset at the beginning of the event period, and communicating to the computing devices the time remaining in the position acquisition period and an aggregate amount of the positions without disclosing the aggregate amount of the positions associated with a specific outcome. The processor then ends the position acquisition period and ceases receiving any additional positions from any user. The processor then begins the event period, calculating a locked price as the price of the asset at the time the event period begins and communicating the locked price to the plurality of remote computing devices. During the event period, the processor calculates an greater position payout multiplier for the position that the price of the asset at the end of event period will be greater than the price of the assert at the beginning of the event period and a less position payout multiplier for the position that the price of the asset at the end of the event period will be less than the price of the asset at the beginning of the event period, and communicates the position payout multipliers to the plurality of remote computing devices. The processor then ends the event period and calculates an end price as the price of the asset at the time the event period ends. If the end price is greater than the locked price, the processor pays the user who communicated the position that the end price of the asset would be greater than the beginning price of the asset an amount equal to the position of the user times the greater position payout multiplier, if the end price is less than the locked price, the processor pays the user who communicated the position that end price of the asset would be less than the beginning amount of the asset an amount equal to the position of the user times the less position payout multiplier; or if the end price is equal to the locked price, pays the amount of the user's position to the user who communicated the position.

In other examples, a device comprises a memory that stores instructions and a processor coupled to the memory and in communication with a plurality of remote computing devices each with a user. The processor, responsive to executing the instructions receiving updates regarding an event and communicating the updates regarding the event to the plurality of remote computing devices. The processor then begins the position acquisition period, and during the position acquisition period, receives from at least one user a position on a first possible outcome of the event or a position on a second possible outcome of the event, and communicates to the plurality of remote computing devices the time remaining in the position acquisition period and an aggregate amount of positions without disclosing the amount of the positions associated with a specific outcome. The processor ends the position acquisition period and ceases receiving any additional positions from the users. The processor then begins the event period and calculates a first outcome position payout multiplier for the position on the first possible outcome and a second possible outcome position payout multiplier for the position on the second outcome and communicating the first outcome and the second outcome position payout multipliers to the plurality of remote computing devices. The processor then ends the event period, and if the first possible outcome occurs, pays the user that communicated a position on the first outcome an amount equal to the position times the first outcome position payout multiplier, if the second possible outcome occurs, pays the user that communicated a position that the second outcome would occur an amount equal to the position times the second outcome position payout multiplier; and if neither occurs, pays the amount of each position to the user who communicated the position.

In other examples, a method is disclosed. The method comprising receiving updates regarding a price of an asset and communicating the updates to a plurality of remote computing devices; beginning the position acquisition period; during the position acquisition period, receiving from at least one user a position that the price of the asset at the end of event period will be greater than the price of the asset at the beginning of the event period or a position that the price of the asset at the end of the event period will be less than the price of the asset at the beginning of the event period, and communicating to the plurality of remote computing devices the time remaining in the position acquisition period and an aggregate amount of positions without disclosing the aggregate amount of the positions for either individual outcome; ending the position acquisition period and ceasing receiving of any additional positions from the users; calculating a locked price as the price of the asset at the time the event period begins and communicating the locked price to the plurality of remote computing devices; beginning the event period; calculating an greater position payout multiplier for the position that the price of the asset at the end of the event period will be greater than the price of the asset at the beginning of the event period and a less position payout multiplier for the position that the price of the asset at the end of the event period will be less than the price of the asset at the beginning of the event phase, and communicating the position payout multipliers to the plurality of remote computing devices; ending the event period; determining an end price as the price of the asset at the time the event period ends; if the end price is greater than the locked price, paying the user who communicated the position that the end price of the asset would be greater than the beginning price an amount equal to the position of the user times the greater position payout multiplier; if the end price is less than the locked price, paying the user who communicated the position that the end price of the asset would be less than the beginning price of the asset an amount equal to the position of the user times the less position payout multiplier; and if the end price is equal to the locked price, paying the amount of each to the user who communicated the position.

BRIEF DESCRIPTION OF THE DRAWINGS

Examples of exercise assemblies are described with reference to the following figures. The same numbers are used throughout the Figures to reference like features and components.

FIGS. 5A and 5B illustrate embodiments of position cards with position prompts.

DETAILED DESCRIPTION

In the present description, certain terms have been used for brevity, clearness and understanding. No unnecessary limitations are to be inferred therefrom beyond the requirement of the prior art because such terms are used for descriptive purposes only and are intended to be broadly construed. The different assemblies described herein may be used alone or in combination with other devices and/or assemblies. Various equivalents, alternatives and modifications are possible within the scope of the appended claims.

The Transaction

Figure 1:
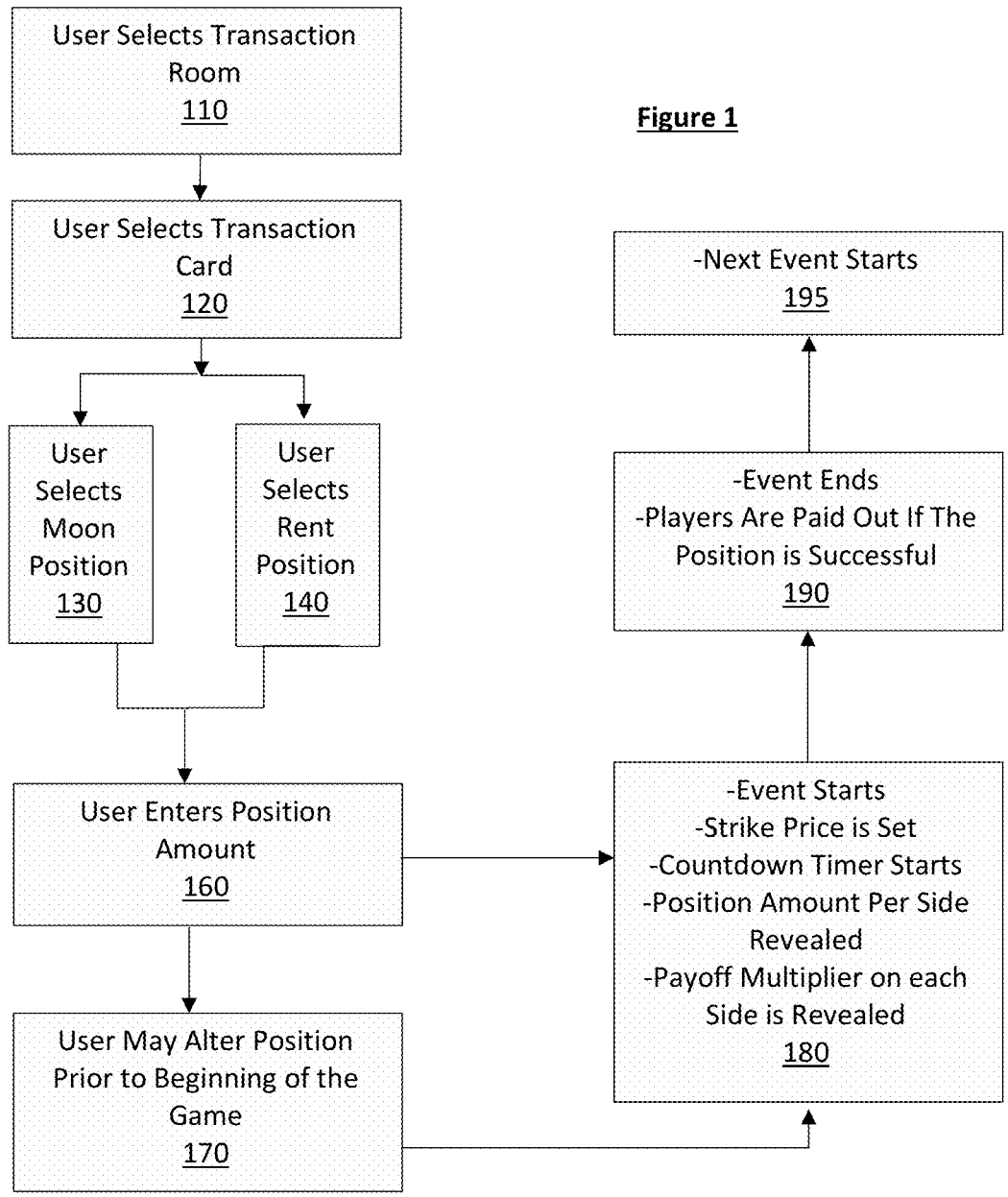
FIG. 1 illustrates a flowchart describing the progression of a transaction.

The objective of the transaction is to correctly predict the outcome of an underlying event where the event has possible mutually exclusive outcomes. The event then occurs, and if the user correctly predicts the outcome, the user receives a payout that comprises a multiple of the position the user placed. In an example of the present embodiment, the user receives a payout if the user correctly predicts whether the end price of an underlying asset will greater than or less than the starting price after a determined amount of time. FIG. 1 depicts an example of an embodiment of the transaction progression for a user. The user begins by selecting a transaction room 110. Once in the transaction room, the user selects a transaction card 120. A transaction card represents a single transaction. Once the user accesses the transaction through the transaction card, the user can select one of two outcomes 130, 140. In the present invention, the outcomes are a "Moon" position outcome and a "Rekt" position outcome, which represents events where the end value of an underlying asset is greater than or less than the beginning value in the underlying asset after a set amount of time respectively. Once the user selects a position outcome, the user enters a position amount 160. Prior to the start of the event, the user may alter the position by either switching outcomes or altering the amount of the position 170. When the event starts, the price of the underlying asset is fixed, and a countdown timer starts 180. In addition, the transaction card now discloses the aggregate position amount per side as well as the payoff multiplier on each side. The event then ends 190, and the transactions the pays the users with successful positions, and the next event starts 195.

Figure 2:
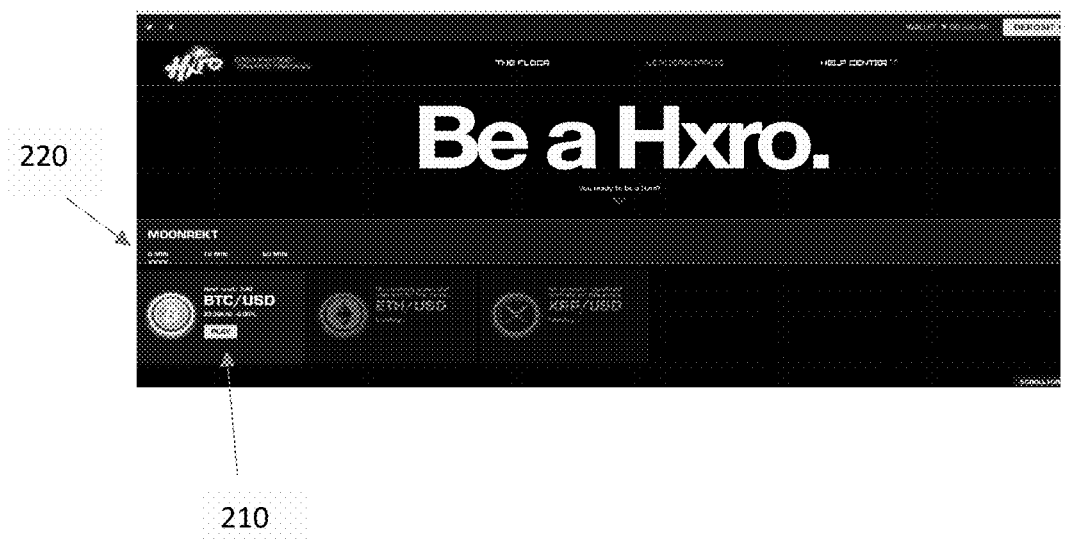
FIG. 2 is a window where a user can select a transaction room.

During the transaction selection process, a user begins by selecting a transaction room based upon the underlying events 210 and durations of the event period 220 as shown in FIG. 2. For example, the underlying event can be a financial event, such as the price of a cryptocurrency 210, including Bitcoin or HXRO cryptocurrency, but can also be the price of an energy product or any market-based asset. In other embodiments, the underlying event can be non-financial such as the outcome of a sporting or gaming event, or any other event which has outcomes that be defined in a digital manner. In this example of the present embodiment, the user can select from a variety of cryptocurrencies. The duration of the event can be any time, but in this example of the present embodiment, the predefined times 5 minutes, 15 minutes, and 60 minutes. Therefore, the user will select a combination of the underlying currency and event period duration. In any specific transaction, the duration of position acquisition period is equal to the duration of the event period.

Figure 3:
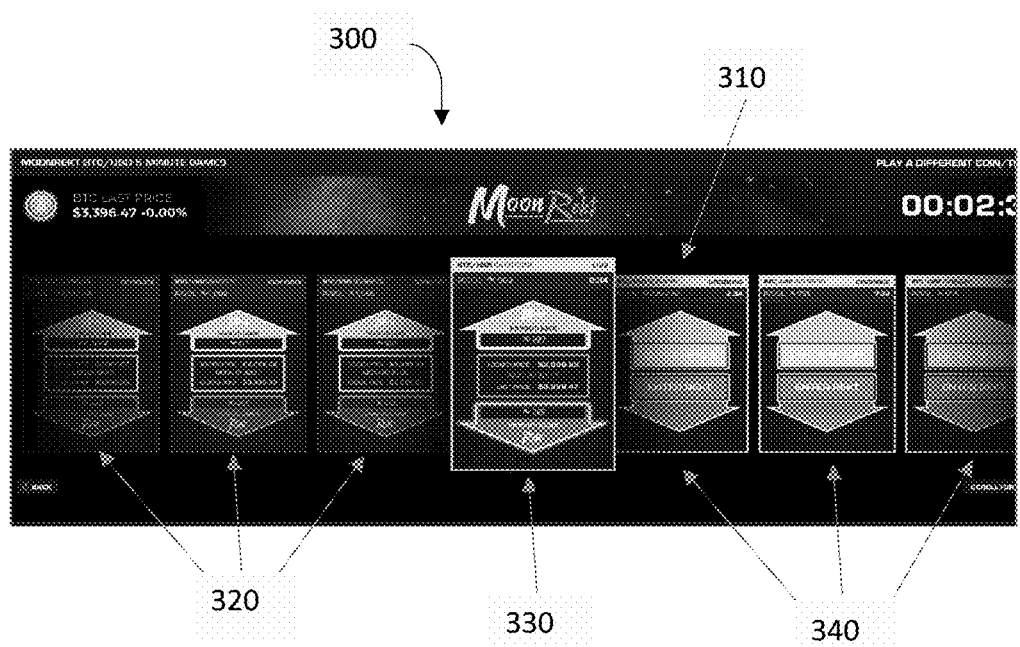
FIG. 3 illustrates an embodiment of a transaction room.

As shown in FIG. 3, upon selection of a specific transaction room based upon an underlying event and event period duration, the user enters the transaction room 300. The present example of an embodiment arranges the available transactions on a carousel 310. The carousel 310 displays recently completed transaction cards 320, current transaction cards 330, and transaction cards that are in the position acquisition period 340. The carousel 310 is arranged such that older transaction cards are to the right of newer transaction cards. The carousel 310 allows a user to scroll through the cards, with the card in the middle of the screen being enlarged. If the user selects a completed transaction card 320, the user can view the results of the transaction. If the user views a current transaction card 330, the use can view the status of the transaction, but cannot place or alter a position. If the user selects a transaction card that is the position acquisition period 340, the user will be able to access that transaction's position acquisition period.

Figure 4:
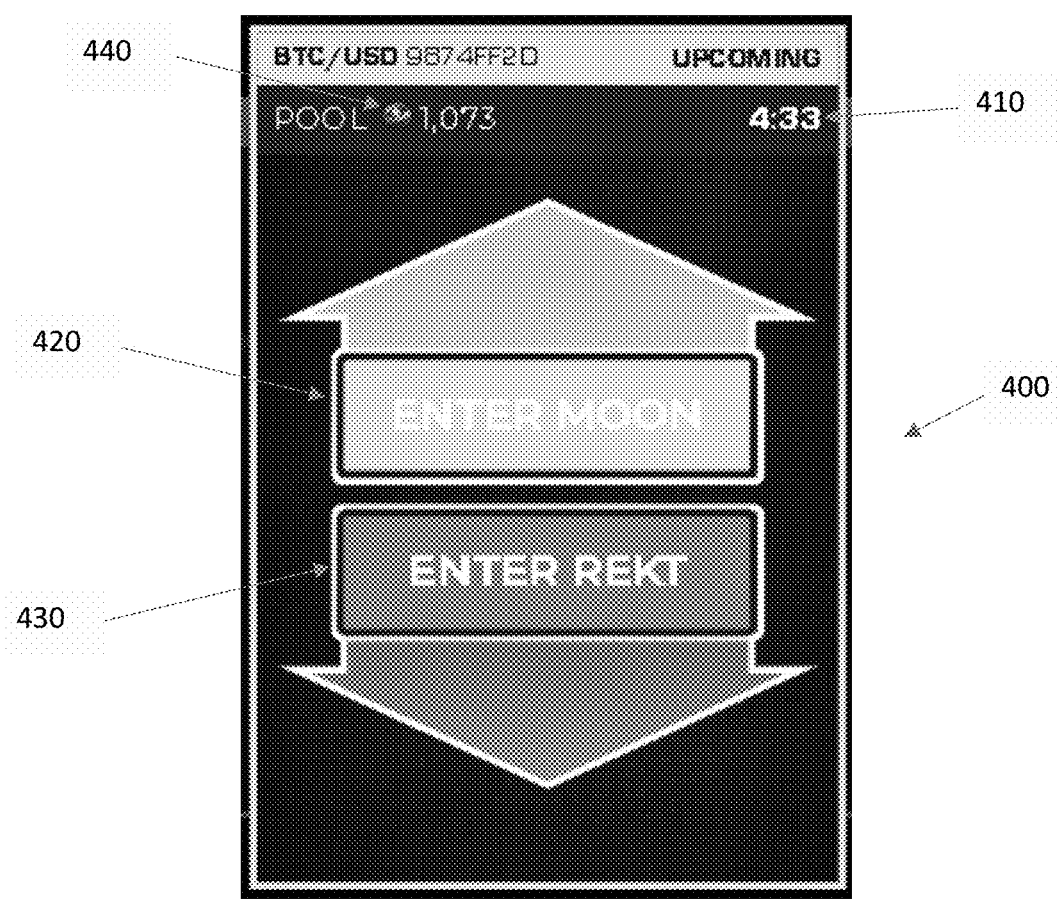
FIG. 4 illustrates an embodiment of a position card.

When the user accesses the position acquisition period, a position card 400 as shown in FIG. 4. is accessible on the screen of the user's computing device. The position card 400 displays a countdown 410 of the time remaining in the position acquisition period before the event period starts. In the present embodiment of the transaction, the position card also displays two input icons 420, 430 to select one of the two distinct outcomes that can occur. The underlying event of this example of one embodiment is the price of a cryptocurrency and the event period duration is 5 minutes. Therefore, the input icons 420, 430 represent the two outcomes relating to the price of the cryptocurrency after the event period. The outcomes are either the price of the cryptocurrency will be greater than the starting price at the end the event period (in the present embodiment, this outcome is called "Moon") or the price of the cryptocurrency will be less than the starting price at the end of the event period (in the present embodiment, this outcome is called "Rekt"). In this present embodiment, the Moon outcome is represented by an up arrow 420, and the Rekt outcome is represented by a down arrow 430. The user makes a prediction by selecting one of the two input icons 420, 430. The position card 400 also displays an aggregate amount of positions for the transaction 440 but does not show the aggregate amount of the positions for the Moon outcome or the Rekt outcome. As a result, while a user may know the size of the total positions, the user cannot see how many of those positions were placed for either possible outcome and cannot know what any potential payout might be during the position acquisition period.

As shown in FIGS. 5A and 5B, when either of the input icons 420, 430 (FIG. 4) is selected, a position amount entry prompt 510 opens so that the user can enter a position amount. Alternatively, the card may use other means of input, including a dial or slider to enter the position amount. When the user completes the position, the amount of the position is deducted from the user's account and placed into a holding account. The user then waits for the event period to begin.

Figure 5C:
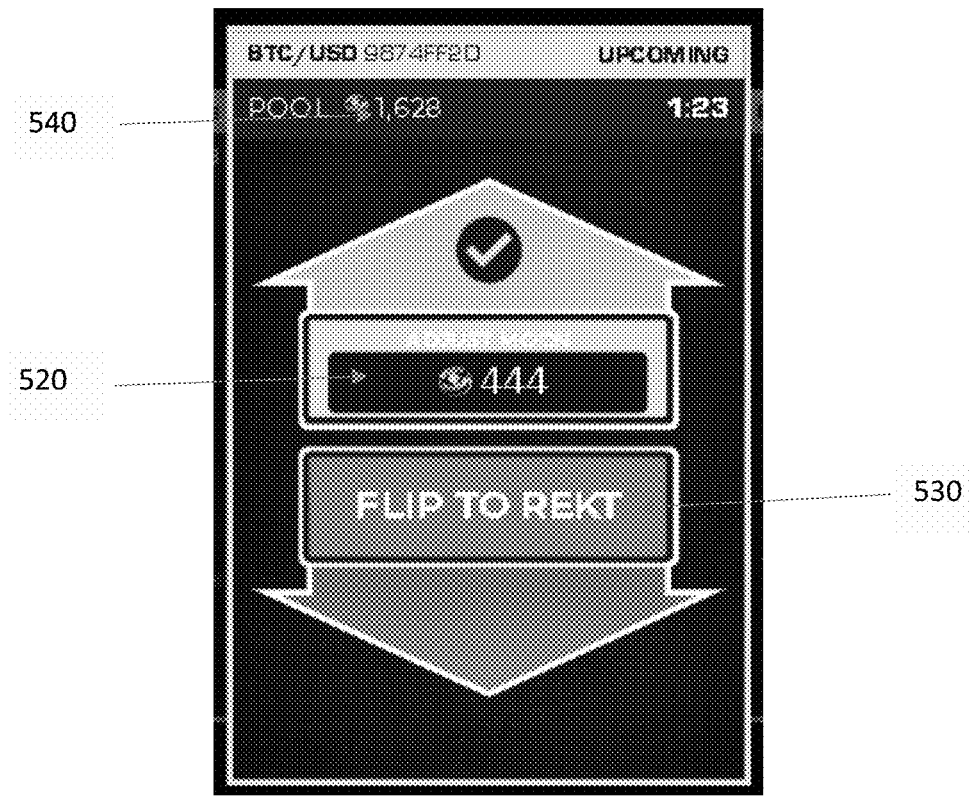
FIG. 5C illustrates an embodiment of a completed position card.

As shown in FIG. 5C, while the user is waiting for the event period to begin, the user can flip the user's position 530, or can alter the position amount in the prompt 520. During the position acquisition period, the aggregate amount of positions is displayed on the card 540. However, the user still cannot see how many of those positions were placed for either possible outcome and, as a result, can be influenced only by the amount positioned, and not which positions have been taken by other users.

Figure 6:
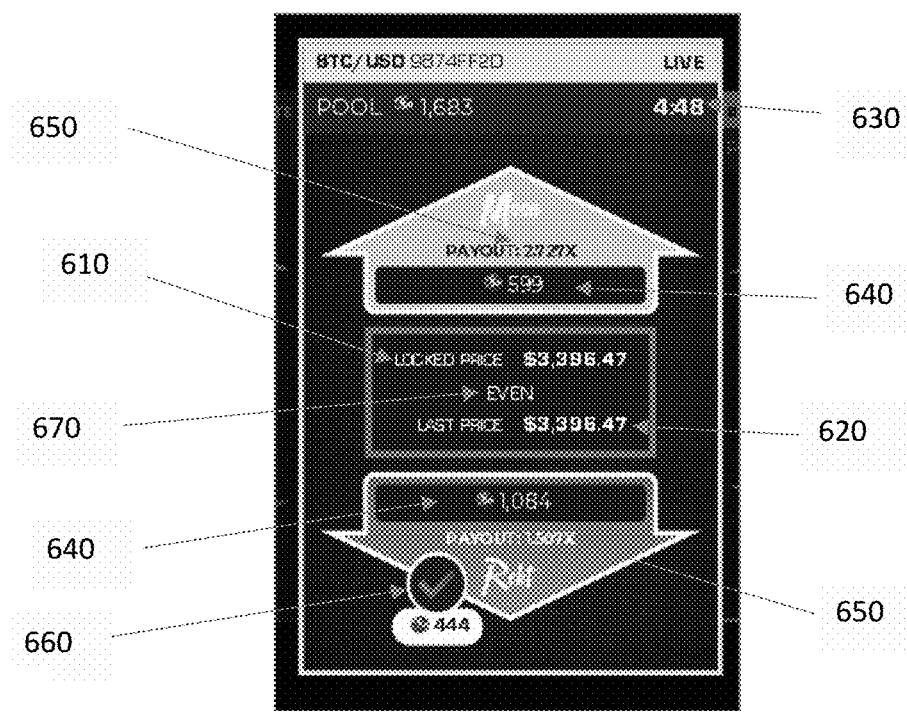
FIG. 6 illustrates an embodiment of a transaction card.

When the time in the position acquisition period expires, the event period begins. The position card then switches to a transaction card as shown in FIG. 6. At the point the event period begins, a starting value, or strike point of the underlying event is set, if necessary. As the strike point is not set until after positions have been made, the strike point is known as a floating strike point. For example, in the current embodiment where the underlying event is the value of a cryptocurrency, the starting value is set as the price of the cryptocurrency at the moment the event period begins. This price is then displayed on the transaction card 610 as the locked price, as well as the current status of the underlying event 620 (displayed as last price) and the difference between the locked price and the last price 670, the time remaining in the event period 630, the aggregate amount of positions for each outcome 640, and the position multiplier for each outcome if that outcome occurs 650. An indicator of which outcome the user positioned on and the amount of that position 660 is also displayed. The user cannot make any changes to the position during the event period. When the duration of the event period expires, the transaction is over and a final price is set, if necessary. In the present embodiment, the final value is set as the price of the cryptocurrency at the time the event period ends. In examples of certain embodiments, such as sporting events, a strike price and end price may not be required.

Figure 7:
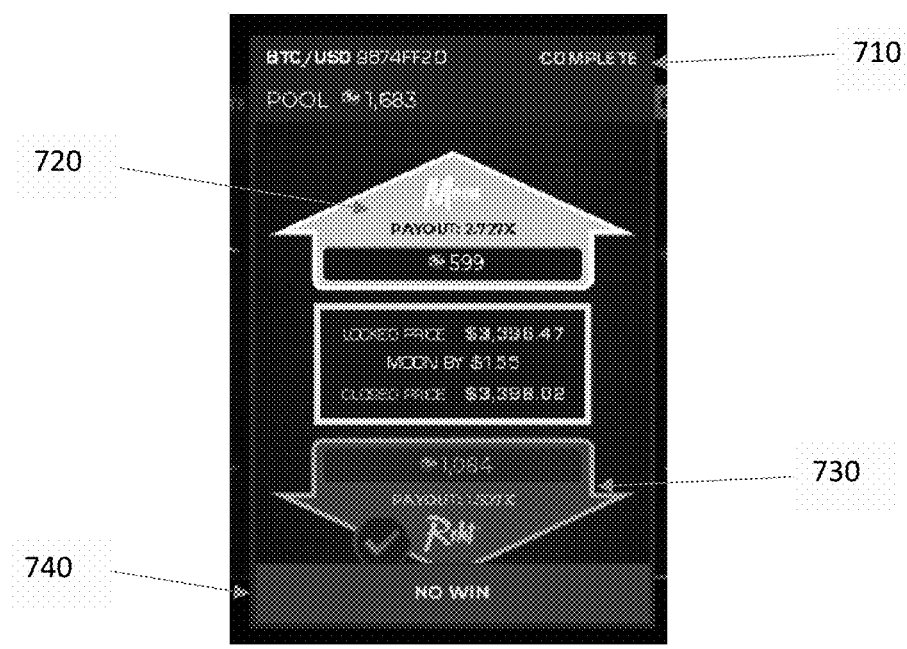
FIG. 7 illustrates an embodiment post-transaction card.

FIG. 7 displays the post-transaction card. During the post event period, the time remaining in the event period shows that the transaction is complete 710. The successful icon will be highlighted 720, and the unsuccessful icon will be greyed out 730. The window 700 will also include a notification to the user that either the position of the user was successful or unsuccessful 740. If the user correctly predicted the outcome, the user will receive a payout amount equal to the user's position times the position multiplier for the successful outcome. The payout will be deposited into the account of the user. In the event there is no successful outcome of the event, each position will be returned to its respective user. Examples of events with no success outcome are when the end price is equal to the strike price or when two teams tie in a sporting event.

The Online Transaction Network

Figure 8:
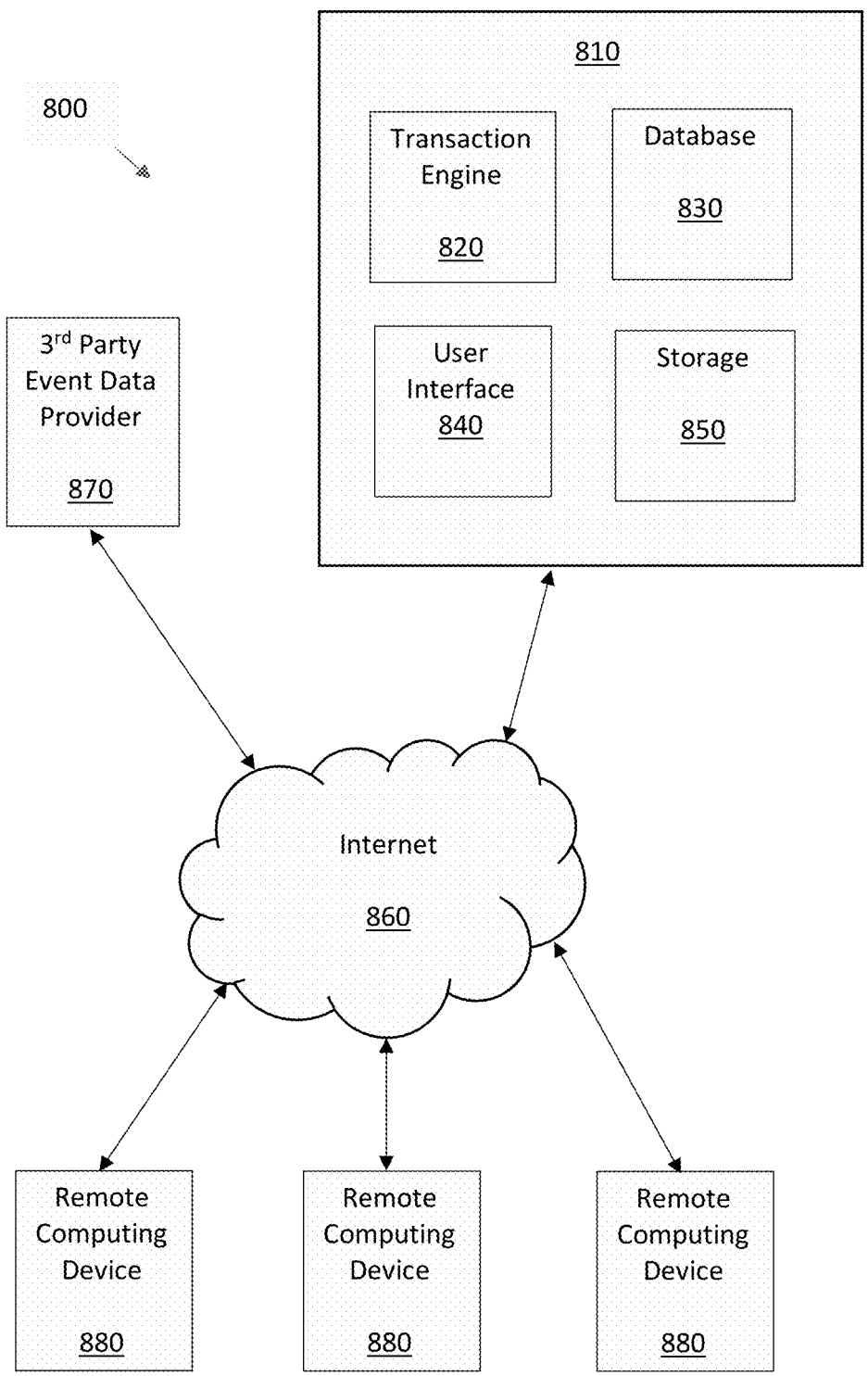
FIG. 8 illustrates an embodiment of an online transaction network.

FIG. 8 depicts an example of an online transaction network 800 of an embodiment of the invention. At the center of the network is a central transaction system 810. The central transaction system 810 can be a mainframe, server, desktop computer or virtual machine, or any other manner of hosting a computer application. The central transaction system further comprises modules, including a transaction engine 820, a database 830, a user interface module 840, and storage 850. The central transaction system 810 is connected to the internet 860. Through the internet 860, the event central transaction system 810 communicates with a third-party event data provider 870, which provides the central transaction system 810 with information regarding the event. The third-party event data provider 870 can be any third party that provides real time information regarding market prices, sports scores and outcomes, e-gaming or any other event that may have two discrete outcomes. The central transaction system 810 is also connected to multiple remote computing devices 880. This connection can be through the internet, a network, or any other means for connecting multiple computing devices. These remote computing devices 880 can be desktop or laptop computers, tablets, cell phones, are any other type of portable or fixed computing system. Each remote computing device 880 provides a user access to the transaction. The user will log in and have access to the user's account, which is stored in the database 830 through the transaction engine 820. The remote computing devices can interface with central transaction system via either a web-based or stand-alone application. In addition, the user, through the transaction engine 820, can access the historical information including information relating to past play, including net payouts, gross payouts, gross profit, highest multiplier, return on investment, hit ratio, number of successful positions, number of unsuccessful positions, and net losses.

The Transaction Engine

Figure 9:
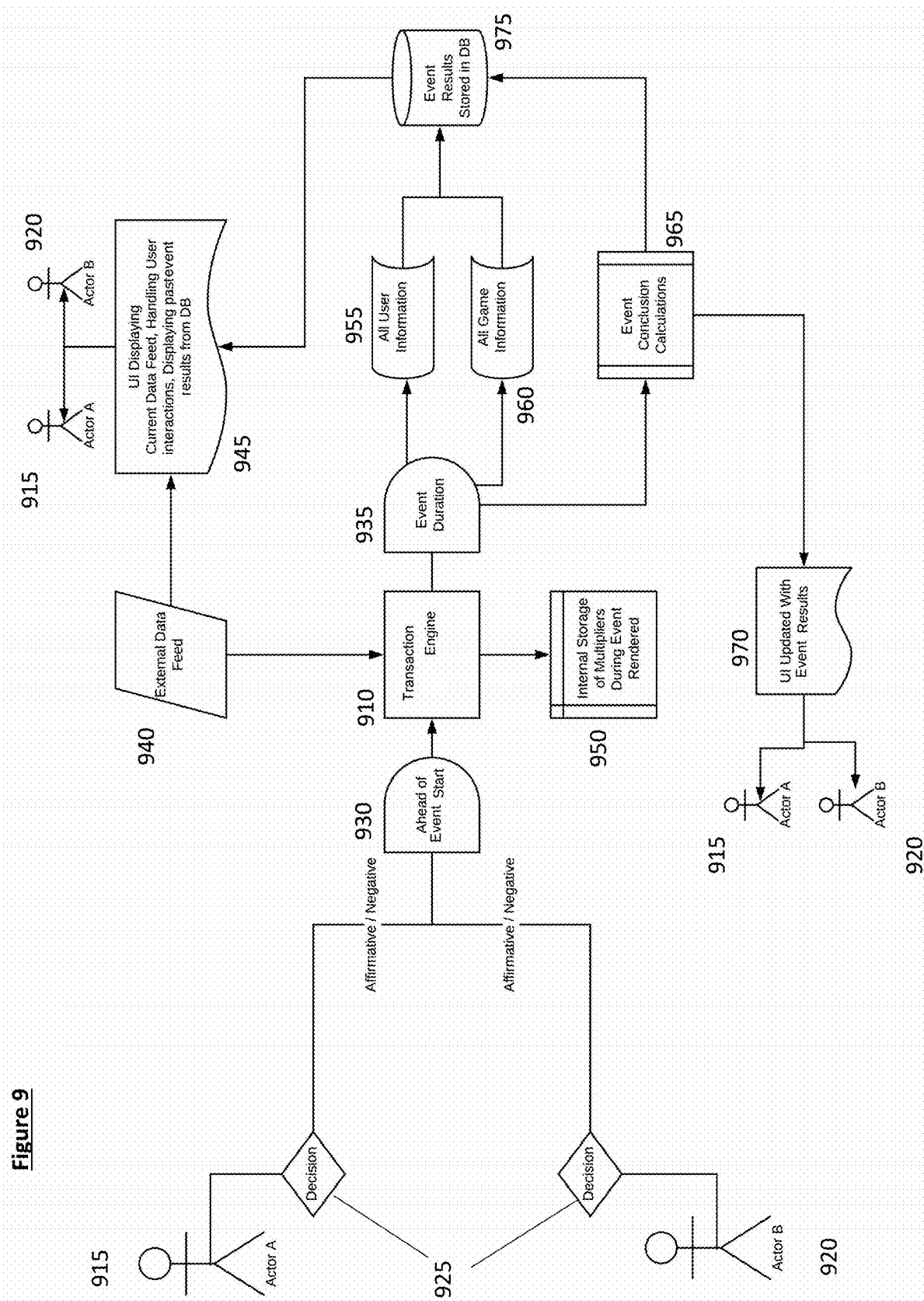
FIG. 9 illustrates a flowchart describing an embodiment of the transaction engine process.

FIG. 9 displays a flowchart demonstrating process of an example of a proposed embodiment of a transaction centered around the transaction engine 910. In this flowchart, the position acquisition period 930 is also represented as "Ahead of Event Start," and the event period 935 is represented by "Event Duration." During the position acquisition period 930 and the event period 935 the transaction engine 910 receives data from an external data feed 940. In one example of an embodiment, the data relates to financial products, such as the value of securities or currencies. The data can also relate to petroleum products. The data can also relate to events such as sporting events, e-gaming event or any other event that has two discrete outputs. The external data feed 940 also provides the data to a user interface 945 that pushes information to and receives instructions from users identified in the flowchart as actor A 915 and actor B 920. This flowchart displays two users, but the number of users in this example is only limited by computing capacity. The user interface 945 provides the user with the event data.

During the position acquisition period 930, the transaction engine 910 also receives decision 925 results from Actor A 915 and Actor B 920. The flowchart represents the decision result as "Affirmative/Negative," or in present example of an embodiment, the decision result will be whether the value of an underlying asset, such as cryptocurrency, will be greater than or less than the starting value. The users 915, 920 enter the decisions 925 through the user interface 945. At the end of the position acquisition period 930, an event period 935 begins. At this point, the transaction engine 910 calculates the position multipliers of both outcomes and stores those multipliers. The position multipliers are based on a pari-mutuel payout. In a pari-mutuel payout, the successful users divide the total positions (less a service fee) proportional to the amount the successful positions. The position multiplier is calculated using the following formula:

$$\text{Position Multiplier} = \frac{\text{Total Positions} - \left(\begin{array}{c}\text{Total Positions} \times \\ \text{Service Fee \% Rate}\end{array}\right)}{\text{Total Successful Positions}}$$

where the Service Fee % Rate is a percentage that the operator of the platform charges the users to run the platform. The service fee is a percentage of the total positions.

During the event period 935, the transaction engine 910 continues to receive data from the external data feed 940, which also continues to supply the data to the users 915, 920 though the user interface 945. At the end of the event period 935, the transaction engine 910 calculates transaction conclusion calculations 965, and the user interface 945 is updated with the transaction results from these transaction conclusion calculations 965. The transaction engine 910 then pushes user information 955 and transaction information 960 to a database 965, which makes the information available to the to the users 915, 920 through the user interface 945.

The differences from this transaction and a digital call option are twofold. Neither the buyer of the Moon outcome nor the seller of the Moon outcome know the strike price before the time at which the position is made. Because the strike price is equal to the price of the underlying asset at the event commencement time, and this value cannot be known ahead of time, the strike price is therefore a random variable. Due to the additional randomness added by this change, the pricing of the Moon outcome changes completely, and deviates from the price of a traditional digital option. The equation for $d_1$ is as follows:

$$d_1 = \frac{\ln\frac{S}{X} + (r - \sigma^2/2)(T-t)}{\sigma\sqrt{T-t}}, d_2 = d_1 - \sigma\sqrt{T-t}$$

Where X is a random variable representing the price of the underlying asset at the time of event commencement, with the assumption that X will evolve according to the following stochastic differential equation:

$$dX = \mu X dt + \sigma X dt$$

where $\mu$ is the drift rate of the underlying asset, and $\sigma$ is its volatility, or standard deviation.

This transaction is also distinguished from a digital option structure. As previously noted, digital "cash-or nothing" option returns a single unit of cash. This transaction, as described above, returns a pari-mutuel payout. This payout is itself a random variable depending upon the amount of positions in the transaction. This significantly changes the price of the option. The theoretical price of the option in the transaction depends on the ratio:

$$P_r/P_m$$

Wherein $P_r$ is the positions that took the opposite position of the user and $P_m$ is the positions that are the same position as the user. This ratio is not observable to buyers before the event period and therefore allows the total positions to better reflect the natural market sentiment.

In an example of an embodiment, each user signs up to a transaction provider, and establishes an account. In a free model, the user can be assigned a number of token or points when the user signs up and can use the tokens or points to place positions. In other examples, the user can sign up for free and pay for tokens or points to be positioned. In yet another version, the user can add currency to the account and use the currency to place positions. These tokens, points or currency can be associated with the user account and stored in the database, and the data regarding the user account, including the number of tokens, points or currency can be accessed and used by the transaction engine to execute the positions.

The transaction system can be applied to numerous other events. For example, the positions can be on a transaction where the users each position on one team winning. Alternatively, the parties can establish positions on the cumulative score of a sporting event being over or under a certain amount, or an individual scoring over a certain amount. For non-numerical positions, a locked number at the start of the event may not be required. In addition, other embodiments might include more than two distinct options. For example, an additional outcome could be where the locked price is equal to the final price, or the predicted ending prices could be listed as ranges with each user being able to place a position on a certain range. Another embodiment may include multiple possible outcomes with only one position. For example, the nominees for an award could all be discrete outcomes with the payout going to users who correctly picked the winning nominee.

The present invention has been described herein with reference to specific exemplary embodiments thereof. It will be apparent to those skilled on the art that a person understanding this invention may conceive of changes or other embodiments or variations, which utilize the principles of this invention without departing from the broader spirit and scope of the invention as set forth in the appended claims.

The invention claimed is:

1. A device, comprising
   a memory that stores instructions; and
   a processor coupled to the memory and in communication with a plurality of remote computing devices each with a user, wherein the processor, responsive to executing the instructions, performs operations comprising:
   receiving updates regarding a price of an asset and communicating the price to the plurality of remote computing devices;
   beginning a position acquisition period of a set amount of time;
   during the position acquisition period, receiving from the at least one user a position that the price of the asset at the end of an event period will be greater than the price of the asset at the beginning of the event period or a position that the price of the asset at the end of the event period will be less than the price of the asset at the beginning of the event period, and communicating to the computing devices the time remaining in the position acquisition period and an aggregate amount of positions without disclosing the aggregate amount of the positions taking any specific position;
   ending the position acquisition period and ceasing receiving of any additional positions from any user;
   beginning the event period;
   calculating a locked price as the price of the asset at the time the event period begins and communicating the locked price to the plurality of remote computing devices;
   calculating an greater position payout multiplier for the position that the price of the asset at the end of the event period will be greater than the price of the asset at the beginning of the event period and a less position payout multiplier for the position that the price of the asset at the end of the event period will be less than the price of the asset at the beginning of the event period and communicating the position payout multipliers to the plurality of remote computing devices;
   ending the event period;
   calculating an end price as the price of the asset at the time the event period ends;
   if the end price is greater than the locked price, paying the user who communicated the position that the price of the asset at the end of the event period will be greater than the price of the asset at the beginning of the event period an amount equal to the position of the user times the greater position payout multiplier; and
   if the end price is less than the locked price, paying the user who communicated the position that the price of the asset at the end of the event period will be less than the price of the asset at the beginning of the event period an amount equal to the position of the user times the less position payout multiplier.

2. The device of claim 1, wherein the asset is a cryptocurrency.

3. The device of claim 1, wherein the asset is foreign currency.

4. The device of claim 1, wherein the asset is a petroleum product.

5. The device of claim 1, wherein the remote computing devices can comprise computers, tablets, or cellular phones.

6. The device of claim 1, wherein
   calculating the greater position payout multiplier further comprises dividing the sum of all positions minus a service fee by the sum of all positions that the price of the asset at the end of the event period will be greater than the price of the asset at the beginning of the event period; and
   calculating the less position payout multiplier further comprises dividing the sum of all positions minus the service fee by the sum of all positions the price of the asset at the end of the event period will be less than the price of the asset at the beginning of the event period.

7. The device of claim 6 wherein the service fee comprises the sum of all positions times a service fee percentage rate.

8. The device of claim 1 wherein the position comprises whether the price of the asset at the end of the event period will be greater or less than the price of the asset at the beginning of the event period and at least one unit of position.

9. The device of claim 8 wherein the unit of position is a currency.

10. A device, comprising
a memory that stores instructions; and
a processor coupled to the memory and in communication with a plurality of remote computing devices each with a user, wherein the processor, responsive to executing the instructions, performs operations comprising:
receiving updates regarding an event, and communicating the updates regarding the event to the plurality of remote computing devices;
beginning a position acquisition period of a set amount of time;
during the position acquisition period, receiving from at least one user a position on a first possible outcome of the event or a position on a second possible outcome of the event, and communicating to the plurality of remote computing devices the time remaining in the position acquisition period and an aggregate amount of positions without disclosing the amount of the positions taking any specific position;
ending the position acquisition period and ceasing receiving of any additional positions from the users;
beginning a event period;
calculating a first outcome position payout multiplier for the position on the first possible outcome and a second possible outcome position payout multiplier for the position on the second outcome and communicating the first outcome and the second outcome position payout multipliers to the plurality of remote computing devices;
ending the event period;
if the first possible outcome occurs, paying the user that communicated a position on the first outcome an amount equal to the position times the first outcome position payout multiplier; and
if the second possible outcome occurs, paying the user that communicated a position that the second outcome would occur an amount equal to the position times the second outcome position payout multiplier.

11. The device of claim 10, wherein the event is a sporting event.

12. The device of claim 10 wherein the event is an e-gaming event.

13. The device of claim 10 wherein each position comprises position credits that user is allotted when the when an account for the user is created.

14. The device of claim 13 wherein the user can purchase additional positioning credits.

15. The device of claim 10 wherein the position is made in a currency.

16. A method comprising:
receiving updates regarding a price of an asset and communicating the updates to a plurality of remote computing devices;
beginning a position acquisition period;
during the position acquisition period, receiving from the at least one user a position that the price of the asset at the end of an event period will be greater than the price of the asset at the beginning of the event period or a position that the price of the asset at the end of the event period will be less than the price at the beginning of the event period, and communicating to the computing devices the time remaining in the position acquisition period and an aggregate amount of positions without disclosing the aggregate amount of the positions taking any specific position;
ending the position acquisition period and ceasing receiving of any additional positions from the users;
calculating a locked price as the price of the asset at the time the position acquisition period ends and communicating the locked price to the plurality of remote computing devices;
beginning the event period;
calculating an greater position payout multiplier for the position that the price of the asset at the end of the event period will be greater than the price of the asset at the beginning of the event period and a less position payout multiplier for the position that the price of the asset at the end of the event period will be less than the price of the asset at the beginning of the event period and communicating the position payout multipliers to the plurality of remote computing devices;
ending the event period;
determining an end price as the price of the asset at the time the event period ends;
if the end price is greater than the locked price, paying the user who communicated the position that the price of the asset at the end of the event period will be greater than the price of the asset at the beginning of the event period an amount equal to the position of the user times the greater position payout multiplier; and
if the end price is less than the locked price, paying the user who communicated the position that the price of the asset at the end of the event period will be less than the price of the asset at the beginning of the event period an amount equal to the position of the user times the less position payout multiplier.

17. The method of claim 16, wherein
calculating the greater position payout multiplier further comprises dividing the sum of all positions minus a service fee by the sum of all positions that the price of the asset at the end of the event period will be greater than the price of the asset at the beginning of the event period; and
calculating the less position payout multiplier further comprises dividing the sum of all positions minus the service fee by the sum of all positions the price of the asset at the end of the event period will be less than the price of the asset at the beginning of the event period.

18. The method of claim 17 wherein the service fee comprises the sum of all wages times a service fee percentage rate.

19. The method of claim 16, wherein the position is made in a currency.

20. The method of claim 16, wherein the position is made in tokens.

* * * * *